United States Patent
Lee (10) Patent No.: US 12,488,855 B2
(45) Date of Patent: Dec. 2, 2025

(54) FAIL CLASSIFICATION DEVICE FOR PLURALITY OF MEMORY CELLS AND METHOD THEREOF

(71) Applicant: SK hynix Inc., Icheon-si (KR)

(72) Inventor: Seon O Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/638,563

(22) Filed: Apr. 17, 2024

(65) Prior Publication Data

US 2025/0201332 A1 Jun. 19, 2025

(30) Foreign Application Priority Data

Dec. 13, 2023 (KR) .......................... 10-2023-0180634

(51) Int. Cl.
*G11C 29/50* (2006.01)

(52) U.S. Cl.
CPC .............................. *G11C 29/50004* (2013.01)

(58) Field of Classification Search
None
See application file for complete search history.

(56) References Cited

U.S. PATENT DOCUMENTS

| | | | |
|---|---|---|---|
| 10,217,517 B2* | 2/2019 | Yim | G11C 16/26 |
| 12,158,806 B1* | 12/2024 | Tate | G06F 11/1044 |
| 12,176,044 B1* | 12/2024 | Nitzan | G11C 16/3431 |
| 2008/0253217 A1* | 10/2008 | Taeuber | G11C 16/08 |
| | | | 365/230.01 |
| 2016/0148695 A1* | 5/2016 | Kim | G11C 29/42 |
| | | | 365/185.12 |
| 2020/0013470 A1 | 1/2020 | Nishikawa et al. | |
| 2021/0072894 A1* | 3/2021 | Chawla | G06F 3/0604 |
| 2021/0192333 A1* | 6/2021 | Thiruvengadam | G06N 3/084 |
| 2021/0193246 A1* | 6/2021 | Jo | G11C 29/42 |
| 2022/0116057 A1* | 4/2022 | Doubchak | H03M 13/1108 |
| 2022/0165337 A1* | 5/2022 | Bhatia | H03M 13/611 |
| 2022/0293192 A1* | 9/2022 | Berman | G06F 3/0604 |
| 2022/0375520 A1* | 11/2022 | Yi | G11C 7/1006 |
| 2023/0421176 A1* | 12/2023 | Doubchak | H03M 13/2945 |
| 2024/0087306 A1* | 3/2024 | Kale | G06N 3/063 |

(Continued)

FOREIGN PATENT DOCUMENTS

| | | | |
|---|---|---|---|
| KR | 10-2017-0045055 A | 4/2017 | |
| KR | 10-2019-0081708 A | 7/2019 | |

OTHER PUBLICATIONS

P. K. Saragada, M. Rathod and B. P. Das, "An In-Memory Architecture for Machine Learning Classifier Using Logistic Regression," 2019 IEEE International Symposium on Smart Electronic Systems (iSES) (Formerly iNiS), Rourkela, India, 2019, pp. 209-214, (Year: 2019).*

*Primary Examiner* — Daniel F. McMahon (57) ABSTRACT

A fail classification device determines a cell type of a plurality of memory cells on the basis of threshold voltage distribution information or determines that the threshold voltage distribution information is abnormal. The fail classification device transforms the threshold voltage distribution information into a two-dimensional image, inputs the two-dimensional image to a target artificial intelligence model corresponding to the cell type, and classifies the fail type of the plurality of memory cells on the basis of the output result of the target artificial intelligence model.

20 Claims, 9 Drawing Sheets

(56) References Cited

U.S. PATENT DOCUMENTS

| | | | |
|---|---|---|---|
| 2024/0089634 A1* | 3/2024 | Kale | H04N 25/709 |
| 2024/0161489 A1* | 5/2024 | Tiku | G06V 10/82 |
| 2024/0177795 A1* | 5/2024 | Chang | G11C 16/26 |
| 2025/0095758 A1* | 3/2025 | Berman | G11C 11/5628 |

* cited by examiner

FAIL CLASSIFICATION DEVICE FOR PLURALITY OF MEMORY CELLS AND METHOD THEREOF

CROSS-REFERENCE TO RELATED APPLICATION

The present application claims priority under 35 U.S.C. § 119(a) to Korean Patent Application No. 10-2023-0180634 filed in the Korean Intellectual Property Office on Dec. 13, 2023, which is incorporated herein by reference in its entirety.

BACKGROUND

1. Technical Field

Various embodiments of the disclosed technology generally relate to a fail classification device for a plurality of memory cells and an operating method thereof.

2. Related Art

In order to analyze fails of a plurality of memory cells, a technique of analyzing the threshold voltage distributions of the plurality of memory cells may be used.

Currently, the work of visualizing and analyzing the threshold voltage distributions of a plurality of memory cells is being manually performed by a human. This is because the unity or consistency of the threshold voltage distributions of the plurality of memory cells cannot be ensured, and a threshold voltage distribution may be different depending on the cell type of the plurality of memory cells even in cases of the same type of fail. Therefore, it is difficult to set accurate determination criteria when analyzing failures of a plurality of memory cells.

Due to this fact, a significant amount of resources are required to analyze the threshold voltage distributions of the plurality of memory cells.

SUMMARY

Various embodiments of the disclosed technology are directed to providing a fail classification device which is robust to variation of data depending on an extraction environment and to operation of the fail classification device. The fail classification device is capable of efficiently classifying a fail with fewer resources even when the cell type of a plurality of memory cells and the capacity of a memory device including the plurality of memory cells change.

In an aspect, a fail classification device may include: i) a memory configured to store threshold voltage distribution information indicating a plurality of threshold voltages and the number of memory cells corresponding to each of the plurality of threshold voltages; and ii) a processor configured to determine, on the basis of the threshold voltage distribution information, a cell type indicating the number of bits per memory cell of a plurality of memory cells or whether the threshold voltage distribution information is abnormal, to transform the threshold voltage distribution information into a two-dimensional image, to input the two-dimensional image to a target artificial intelligence model corresponding to the cell type, and to classify a fail type of the plurality of memory cells on the basis of an output result of the target artificial intelligence model.

In another aspect, a fail classification method may include: i) determining, based on threshold voltage distribution information of a plurality of memory cells, a cell type indicating the number of bits per memory cell of the plurality of memory cells or whether the threshold voltage distribution information is abnormal; ii) transforming the threshold voltage distribution information into a two-dimensional image; iii) inputting the two-dimensional image to a target artificial intelligence model corresponding to the cell type; and iv) classifying a fail type of the plurality of memory cells based on an output result of the target artificial intelligence model.

According to the embodiments of the disclosed technology, it is possible to accommodate variation in data depending on an extraction environment and efficiently classify a fail with fewer resources, even when the cell type of a plurality of memory cells and the capacity of a memory device including the plurality of memory cells changes or varies.

DETAILED DESCRIPTION

Hereinafter, embodiments of the present disclosure are described in detail with reference to the accompanying drawings. Throughout the specification, references to "an embodiment," "another embodiment" or the like are not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and the disclosure should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
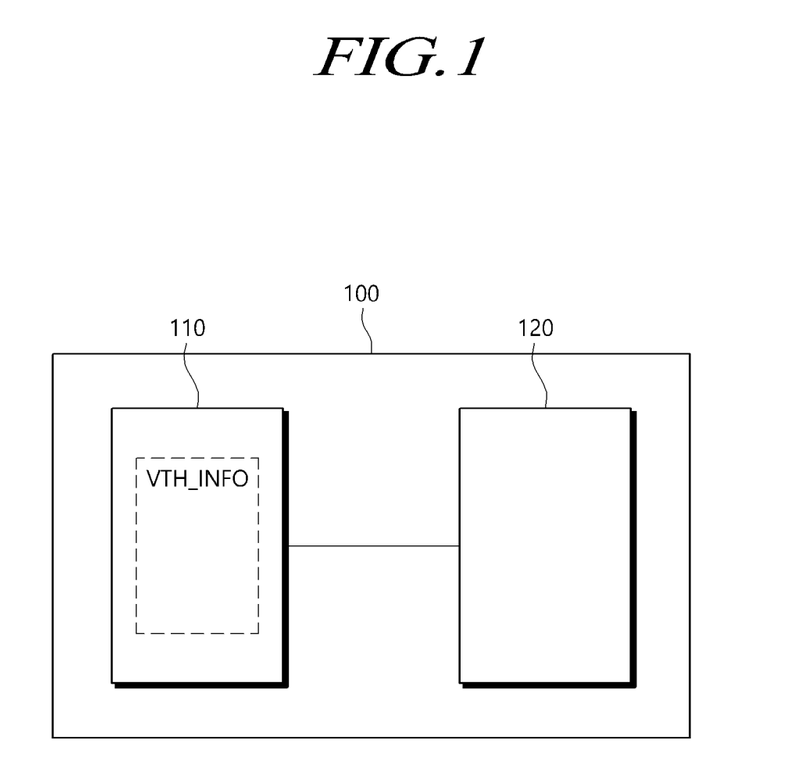
FIG. 1 is a diagram illustrating an example of a structure of a fail classification device according to an embodiment of the present disclosure.

FIG. 1 is a diagram illustrating an example of a structure of a fail classification device according to an embodiment of the present disclosure.

Referring to FIG. 1, a fail classification device 100 may include a memory 110 and a processor 120.

The memory 110 may store threshold voltage distribution information VTH_INFO of a plurality of memory cells. For example, the memory 110 may be a volatile memory including at least one of an SRAM (static RAM), a DRAM (dynamic RAM) and an SDRAM (synchronous DRAM).

The memory 110 may further store computer-readable software, an application, a program module, a routine, instructions and/or data that is coded to perform a specific task when executed by the processor 120.

The plurality of memory cells may be included in a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The plurality of memory cells may each store one or more bits of data. For example, each of the plurality of memory cells may be a single-level cell (SLC) that stores one bit of data. In another example, each of the plurality of memory cells may be a multi-level cell (MLC) that stores two bits of data. In still another example, each of the plurality of memory cells may be a triple-level cell (TLC) that stores three bits of data. In yet another example, each of the plurality of memory cells may be a quad-level cell (QLC) that stores four bits of data. In a further example, each of the plurality of memory cells may store five or more bits of data.

The number of data bits that may be stored per memory cell may be dynamically changed.

The threshold voltage distribution information VTH_INFO may indicate a plurality of threshold voltages and the number of memory cells, from among the plurality of memory cells, corresponding to each of the plurality of threshold voltages.

When a predetermined read bias is applied to each of the plurality of memory cells through a corresponding word line, the memory cells may be turned on or may maintain a turned-off state depending on the threshold voltage. In detail, each memory cell may be turned on when a read bias higher than the threshold voltage is applied, and may maintain a turned-off state when a read bias lower than the threshold voltage is applied.

In order to measure the threshold voltage distribution information VTH_INFO, an operation of sequentially increasing a threshold voltage for the plurality of memory cells by a predetermined magnitude, and then counting the number of newly turned-on memory cells, may be performed repeatedly.

The threshold voltage distribution information VTH_INFO may be expressed in various formats. For example, the threshold voltage distribution information VTH_INFO may be configured in the form of a one-dimensional vector.

The processor 120 may classify the fail type of the plurality of memory cells on the basis of the threshold voltage distribution information VTH_INFO stored in the memory 110.

The processor 120 may perform logical operations for classifying the fail type of the plurality of memory cells on the basis of the threshold voltage distribution information VTH_INFO. To this end, the processor 120 may run software including binary data in which the above-described logical operations are defined.

The processor 120 may read and execute the computer-readable software, application, program module, routine, instructions and/or data stored in the memory 110.

The fail classification device 100 may be implemented by a computing device that includes at least a part of a user input device and a presentation device in addition to the memory 110 and the processor 120 described above. The user input device may be means for allowing a user to input a command that causes the processor 120 to execute a specific task or input data that is required to execute a specific task. The user input device may include a physical or virtual keyboard or keypad, a key button, a mouse, a joystick, a trackball, touch-sensitive input means, or a microphone. The presentation device may include a display, a printer, a speaker, or a vibrating device.

The computing device may include a variety of devices such as a smartphone, a tablet, a laptop, a desktop, a server and a client. The computing device may be a single stand-alone device, or may include a plurality of computing devices that operate in a distributed environment configured with a plurality of computing devices cooperating with each other through a communication network.

When implemented by firmware or software, the firmware or software executed by the fail classification device 100 based on the embodiment of the disclosed technology may be implemented in the form of a device, a procedure or a function that performs the functions or operations described above. A software code may be stored in the memory 110 and may be run by the processor 120. The memory 110 may exchange data with the processor 120 by various means already known.

Figure 2:
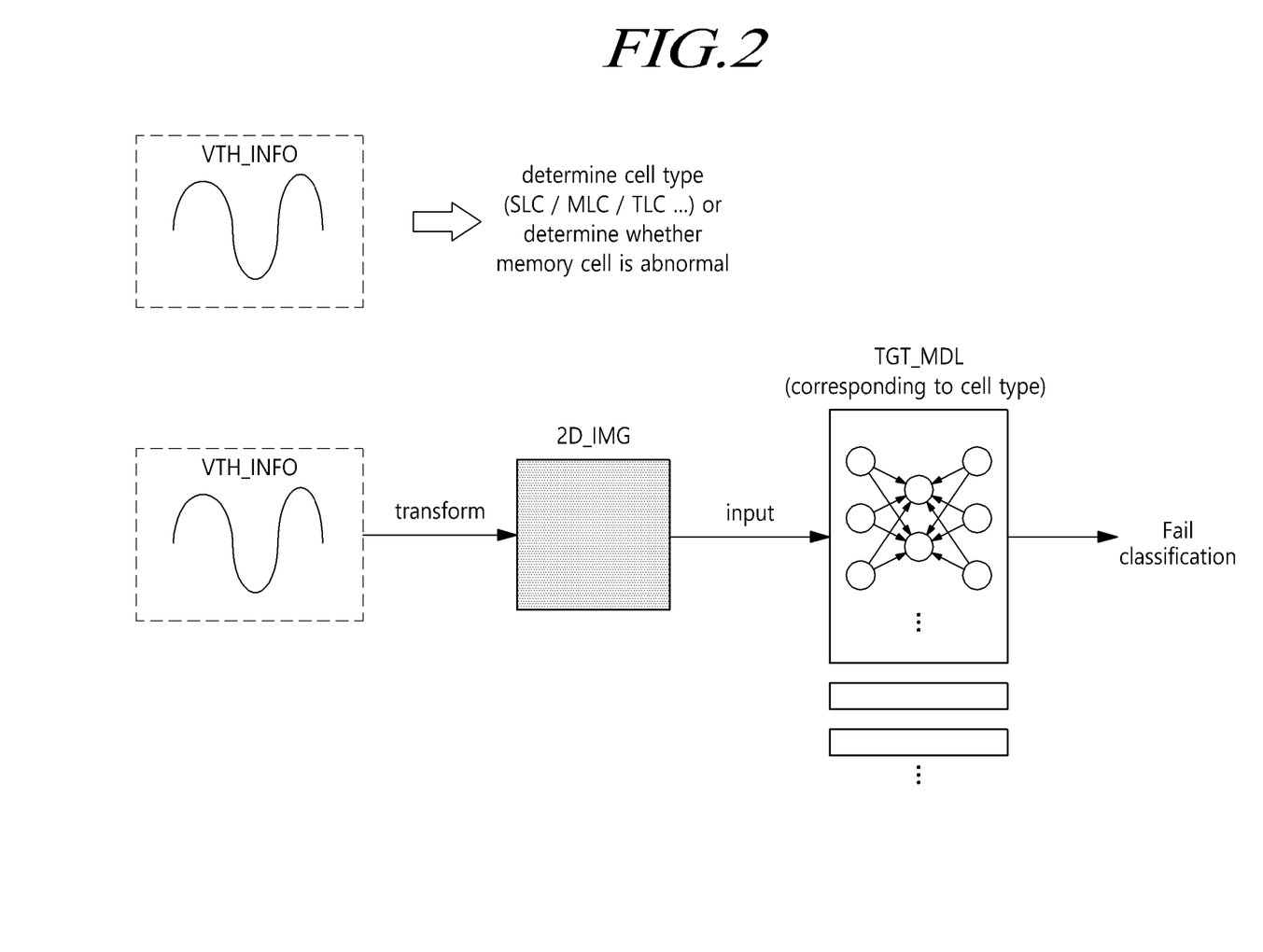
FIG. 2 is a diagram illustrating an operation of a fail classification device according to an embodiment of the present disclosure.

FIG. 2 is a diagram illustrating an operation of a fail classification device according to an embodiment of the present disclosure.

Referring to FIG. 2, on the basis of the threshold voltage distribution information VTH_INFO, a processor 120 of a fail classification device 100 may determine the cell type of a plurality of memory cells or determine whether a threshold voltage distribution information VTH_INFO is abnormal.

The cell type may indicate the number of bits per memory cell of the plurality of memory cells. For example, the cell type may be one of SLC, MLC, TLC and QLC described above.

The fail classification device 100 may accurately determine the cell type of the plurality of memory cells even when the threshold voltage distribution information VTH_INFO changes due to variation of data depending on an extraction environment. As a result, the fail classification device 100 may be robust to variation of data. In addition, it is possible to classify a fail for a plurality of memory cells that have a new cell type.

The processor 120 may transform the threshold voltage distribution information VTH_INFO into a two-dimensional image 2D_IMG.

The processor 120 may input the two-dimensional image 2D_IMG to a target artificial intelligence model TGT_MDL. The target artificial intelligence model TGT_MDL may be an artificial intelligence model, from among a plurality of artificial intelligence models, that corresponds to the above-described cell type.

For example, when the cell type is determined as SLC, the processor 120 may input the two-dimensional image 2D_IMG to an artificial intelligence model that corresponds to SLC from among the plurality of artificial intelligence models. In another example, when the cell type is determined as MLC, the processor 120 may input the two-dimensional image 2D_IMG to an artificial intelligence model that corresponds to MLC from among the plurality of artificial intelligence models.

By classifying a fail using an artificial intelligence model that is optimized for the cell type of the plurality of memory cells, the fail classification device 100 may efficiently classify a fail with fewer resources even when the cell type of the plurality of memory cells changes. Furthermore, once the cell type of the plurality of memory cells is determined, the fail classification device 100 may select an artificial intelligence model regardless of the capacity of a memory device including the plurality of memory cells. That is to say, the fail classification device 100 does not need to configure a different artificial intelligence model depending on the capacity of a memory device.

The plurality of artificial intelligence models described in disclosed embodiments may be models capable of learning through learning data.

Performing learning on a model means that parameters for the model (e.g., weights of nodes included in the model) are adjusted so that an output value for an input to the model is as similar as possible to a ground-truth.

Meanwhile, the learning process of the model may be expressed as training and a result thereof may be expressed as learning, but either training or learning may be used to express a learning process or a result thereof.

The model described in disclosed embodiments may be a current or future machine learning model such as a model that has undergone algorithm-based machine learning or a model that has undergone artificial neural network-based learning.

A model that has undergone algorithm-based machine learning may be, for example, a classic machine learning model such as a tree-based model, k-Nearest Neighbors, k-Means Clustering, PCA (Principal Component Analysis) and a SVM (support vector machine).

The tree-based model may be, for example, a decision tree model, a regression model or a random tree model.

The model described in disclosed embodiments may be not only one learned model, but may also be an ensemble model that solves a problem by combining and learning from multiple models.

The ensemble model may prevent overfitting and improve generalization performance by combining multiple individually learned models. The ensemble model may aid in improving performance when the performance of individual models is not secured.

The ensemble model may be broadly divided into a voting method and a boosting method.

The voting method is a method of deriving a final result through voting on results generated by multiple models. For example, the voting method includes a bagging technique that combines the same type of algorithms but uses different learning data, and a voting technique that combines different types of algorithms.

The boosting method is a method of combining weak machine learning models to create a more accurate and powerful machine learning model. The boosting method is a method in which, when weak machine learning models sequentially work, later machine learning models additionally explore areas that an earlier machine learning model could not find. For example, the boosting method may be random forest, gradient boosting, XGBoost (extra Gradient Boost), etc.

An artificial neural network is a machine learning algorithm that imitates the operating principle of the human brain and analyzes and learns complex data on the basis of a plurality of artificial neurons connected to each other. The artificial neural network may be any artificial neural network such as a multi-layer perceptron (MLP), which is a most basic artificial neural network structure configured with an input layer, a hidden layer and an output layer, a convolutional neural network (CNN), which performs a convolution operation to extract the features of an image and reduces dimensionality through a pooling operation, and a recurrent neural network (RNN), which is an artificial neural network structure used to process ordered data. The artificial neural networks may be modified in various ways depending on the complexity and diversity of data.

A model that has undergone artificial neural network-based learning may also be an ensemble model that solves a problem by learning and combining multiple models rather than learning and using only one model.

The algorithm-based machine learning model and the model that has undergone artificial neural network-based learning may be used to complement each other. For example, the algorithm-based machine learning model may use the result of the model, which has undergone artificial neural network-based learning, and the model that has undergone artificial neural network-based learning may use the result of the algorithm-based machine learning model. An ensemble model that is between the algorithm-based machine learning model and the model that has undergone artificial neural network-based learning may be used.

The processor 120 may classify the fail type of the plurality of memory cells on the basis of the output result of the target artificial intelligence model TGT_MDL. The fail type of the plurality of memory cells may indicate whether a fail has occurred in the plurality of memory cells, and may indicate, when a fail has occurred, the details of the fail.

Figure 3:
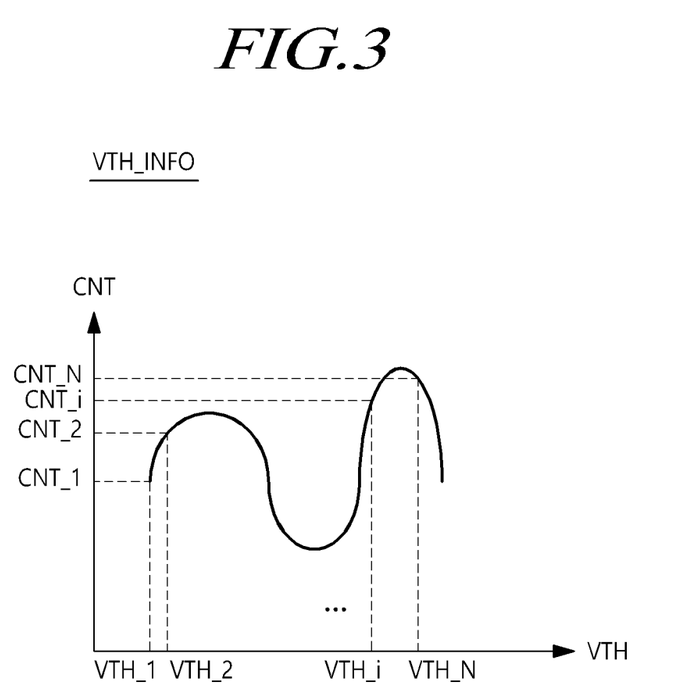
FIG. 3 is a diagram illustrating an example of threshold voltage distribution information according to an embodiment of the present disclosure.

FIG. 3 is a diagram illustrating an example of threshold voltage distribution information according to an embodiment of the present disclosure.

Referring to FIG. 3, a threshold voltage distribution information VTH_INFO may indicate N (where N is a natural number of 2 or greater) number of memory cell counts CNT_1, CNT_2, . . . and CNT_N determined on the basis of an N number of threshold voltages VTH_1, VTH_2, . . . and VTH_N.

An ith (where I is a natural number equal to or less than N) memory cell count CNT_i may indicate the number of the memory cell, from among the plurality of memory cells, that corresponds to an ith threshold voltage VTH_i.

The memory cell count CNT_i may be determined by the number of memory cells, among the plurality of memory cells, that maintains a turned-off state when a threshold voltage lower than the ith threshold voltage VTH_i is applied, and that turns on when the ith threshold voltage VTH_i is applied.

For example, the threshold voltage distribution information VTH_INFO may indicate 40 memory cell counts determined on the basis of 40 threshold voltages, which sequentially increase from −2.0V to 5.8V at intervals of 0.2V.

The threshold voltage distribution information VTH_INFO may express the above-described N number of memory cell counts CNT_1, CNT_2, . . . and CNT_N in the form of a 1*N one-dimensional vector. For example, the 40 memory cell counts determined on the basis of the 40 threshold voltages described above may be expressed as a 1*40 one-dimensional vector.

The threshold voltage distribution information VTH_INFO may indicate the N number of threshold voltages VTH_1, VTH_2, . . . and VTH_N and the N number of memory cell counts CNT_1, CNT_2, . . . and CNT_N corresponding to the N number of threshold voltages VTH_1, VTH_2, . . . and VTH_N. The threshold voltage distribution information VTH_INFO may be expressed as a graph between threshold voltage VTH and memory cell count CNT.

In the graph illustrating threshold voltage VTH and memory cell count CNT, a minimum value of memory cell count CNT may exist. The number of minimum values of memory cell count CNT may vary depending on the cell type of the plurality of memory cells.

Figure 4:
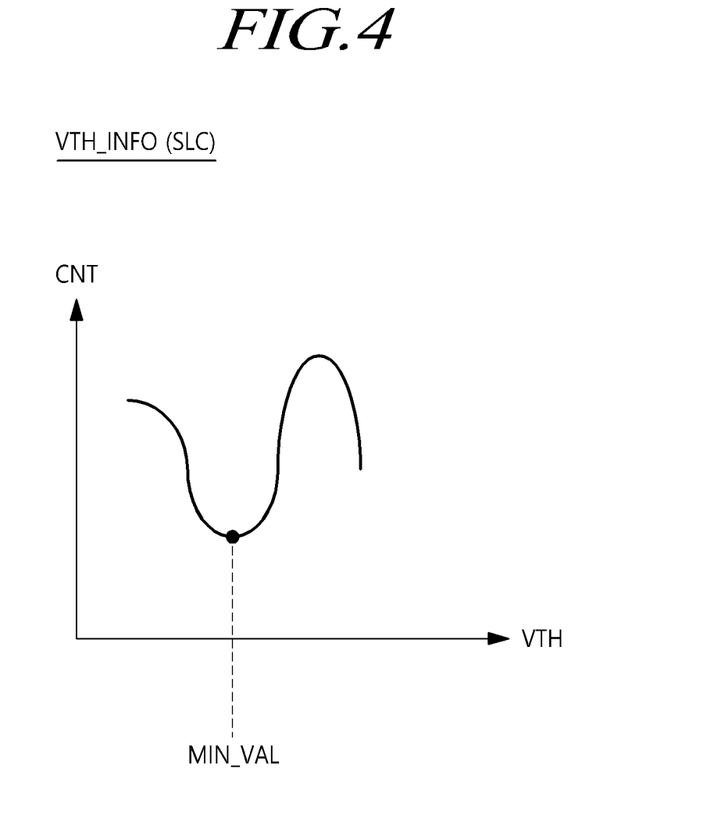
FIG. 4 is a diagram illustrating an example of a minimum value of a threshold voltage distribution information according to an embodiment of the present disclosure.

FIG. 4 is a diagram illustrating an example of a minimum value of a threshold voltage distribution information according to an embodiment of the present disclosure.

FIG. 4 is a graph between threshold voltage VTH and memory cell count CNT for SLC type memory cells. A minimum value MIN_VAL is illustrated in the graph.

Figure 5:
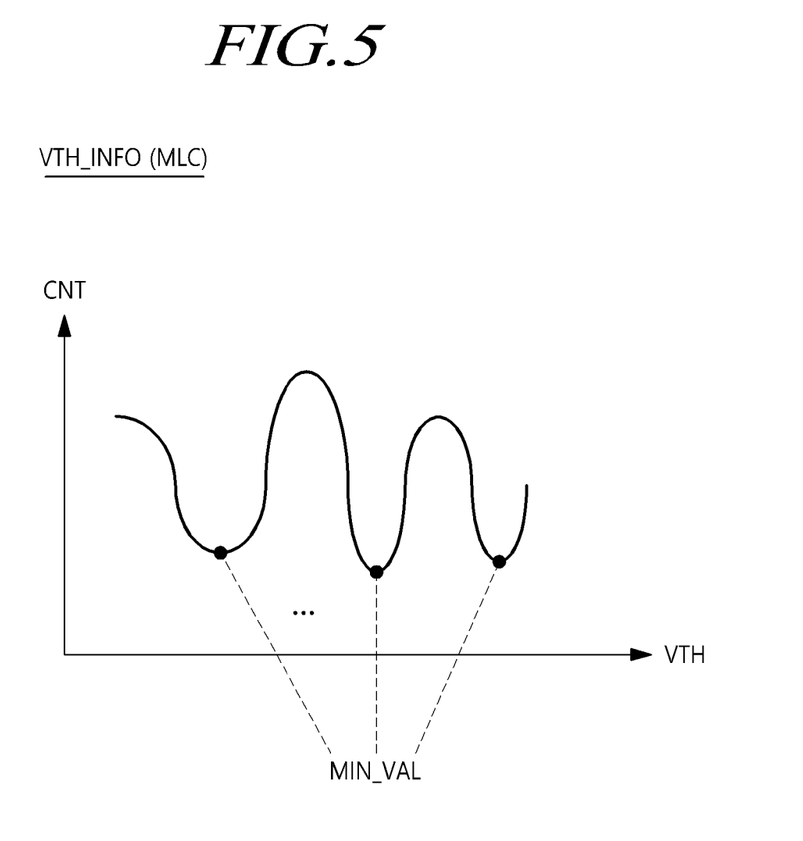
FIG. 5 is a diagram illustrating another example of a minimum value of threshold voltage distribution information according to an embodiment of the present disclosure.

FIG. 5 is a diagram illustrating another example of a minimum value of threshold voltage distribution information according to an embodiment of the present disclosure.

FIG. 5 is a graph between threshold voltage VTH and memory cell count CNT for MLC type memory cells. Three minimum values MIN_VAL may exist in the graph.

Since the number of minimum values may change depending on the cell type of the plurality of memory cells, a processor 120 of a fail classification device 100 may determine a cell type on the basis of the number of minimum values among the above-described N number of memory cell counts CNT_1, CNT_2, . . . and CNT_N.

The processor 120 may determine the number of minimum values using a set peak finding algorithm. When considering the N number of memory cell counts CNT_1, CNT_2, . . . and CNT_N as a type of signal data, all minimum values that exist in the N number of memory cell counts CNT_1, CNT_2, . . . and CNT_N may be found by applying a peak finding algorithm.

The peak finding algorithm is a straight-forward technique that finds a minimum value existing in all data in a vector. For example, the peak finding algorithm may be an existing algorithm such as a sequential search algorithm or a binary search algorithm.

The processor 120 may remove noise present in the threshold voltage distribution information VTH_INFO before applying the peak finding algorithm. For example, in order to remove noise at both ends, the processor 120 may remove some values from among the N number of memory cell counts CNT_1, CNT_2, . . . and CNT_N and apply Gaussian filtering.

In addition, when applying the peak finding algorithm, the processor 120 may set a maximum/minimum value condition for minimum values or a minimum interval condition between minimum values to filter out a value that does not satisfy the conditions. For example, the minimum values may be between a preset minimum value (e.g., 10) and a preset maximum value (e.g., 100), and, when the number of minimum values is equal to or greater than 2, the interval between minimum values may be equal to or larger than a minimum interval (e.g., 0.4V).

Figure 6:
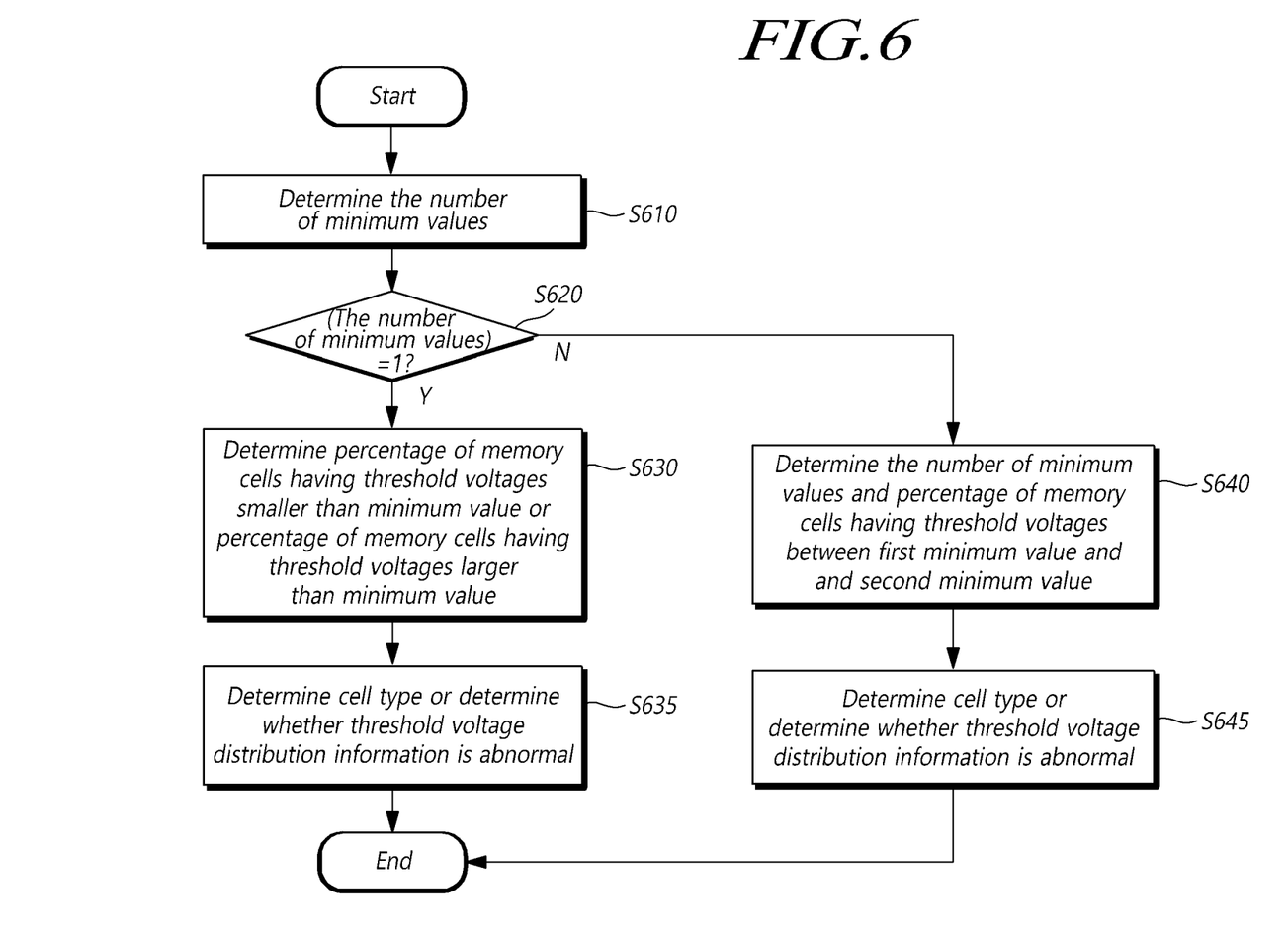
FIG. 6 is a diagram illustrating an operation in which a fail classification device determines a cell type according to an embodiment of the present disclosure.

FIG. 6 is a diagram illustrating an operation in which a fail classification device determines a cell type according to an embodiment of the present disclosure.

Referring to FIG. 6, a processor 120 of a fail classification device 100 may determine a number of minimum values from among the above-described N number of memory cell counts CNT_1, CNT_2, . . . and CNT_N (S610).

The processor 120 determines whether the number of minimum values is 1 (S620).

When the number of minimum values is 1 (S620—Y), the processor 120 may determine the percentage of memory cells having threshold voltages smaller than a threshold voltage, which corresponds to a minimum value, from among the plurality of memory cells. Alternatively, the processor 120 may determine the percentage of memory cells having threshold voltages larger than the threshold voltage, which corresponds to the minimum value, from among the plurality of memory cells (S630).

In the step S635, the processor 120 may determine a cell type or determine whether the threshold voltage distribution information VTH_INFO is abnormal using the percentage obtained in step S630.

For example, when the number of minimum values is 1 and the difference between the percentage of memory cells having threshold voltages smaller than a threshold voltage corresponding to a minimum value among the plurality of memory cells and a preset reference percentage (e.g., 50%) is equal to or less than a threshold percentage, the processor 120 may determine a cell type as SLC.

When the number of minimum values is 1 and the difference between the percentage of memory cells having threshold voltages smaller than a threshold voltage corresponding to a minimum value among the plurality of memory cells and the preset reference percentage (e.g., 50%) is greater than the threshold percentage, the processor 120 may determine that the threshold voltage distribution information VTH_INFO is abnormal.

If the number of minimum values is not 1 (S620—N), that is, when it is determined that the number of minimum values is 2 or greater, then the processor 120 may determine the number of minimum values and the percentage of memory cells having threshold voltages between a threshold voltage corresponding to a first minimum value and a threshold voltage corresponding to a second minimum value (S640).

The processor 120 may determine a cell type or determine whether the threshold voltage distribution information VTH_INFO is abnormal in step S645 according to the percentage determined in the step S640.

In a graph between threshold voltage VTH and memory cell count CNT (not illustrated), the percentage of memory cells having threshold voltages between the threshold voltage corresponding to the first minimum value and the threshold voltage corresponding to the second minimum value corresponds to the integration of the section from the threshold voltage corresponding to the first minimum value to the threshold voltage corresponding to the second minimum value in the graph between threshold voltage VTH and memory cell count CNT.

The first minimum value and the second minimum value may be two adjacent minimum values from among minimum values of the N number of memory cell counts CNT_1, CNT_2, . . . and CNT_N, where no additional minimum value is located between the first minimum value and the second minimum value, which are adjacent to each other.

For example, when the number of minimum values is 3 and the difference between the percentage of memory cells having threshold voltages between a threshold voltage corresponding to a first minimum value and a threshold voltage corresponding to a second minimum value and a reference percentage (e.g., 25%) is equal to or less than a threshold percentage, the processor 120 may determine a cell type as MLC.

When the number of minimum values is 3 and the difference between the percentage of memory cells having threshold voltages between a threshold voltage corresponding to a first minimum value and a threshold voltage corresponding to a second minimum value and the reference percentage (e.g., 25%) is greater the threshold percentage, the processor 120 may determine that the threshold voltage distribution information VTH_INFO is abnormal.

In another example, when the number of minimum values is 7 and the difference between the percentage of memory cells having threshold voltages between a threshold voltage corresponding to a first minimum value and a threshold voltage corresponding to a second minimum value and a reference percentage (e.g., 12.5%) is equal to or less than a threshold percentage, the processor 120 may determine a cell type as TLC.

When the number of minimum values is 7 and the difference between the percentage of memory cells having threshold voltages between a threshold voltage corresponding to a first minimum value and a threshold voltage corresponding to a second minimum value and the reference percentage (e.g., 12.5%) is greater the threshold percentage, the processor 120 may determine that the threshold voltage distribution information VTH_INFO is abnormal.

In the above examples, operations of determining cell type in a plurality of memory cells using threshold voltage distribution information VTH_INFO has been described.

Hereinafter, an operation of transforming the threshold voltage distribution information VTH_INFO into the two-dimensional image 2D_IMG will be described.

Figure 7:
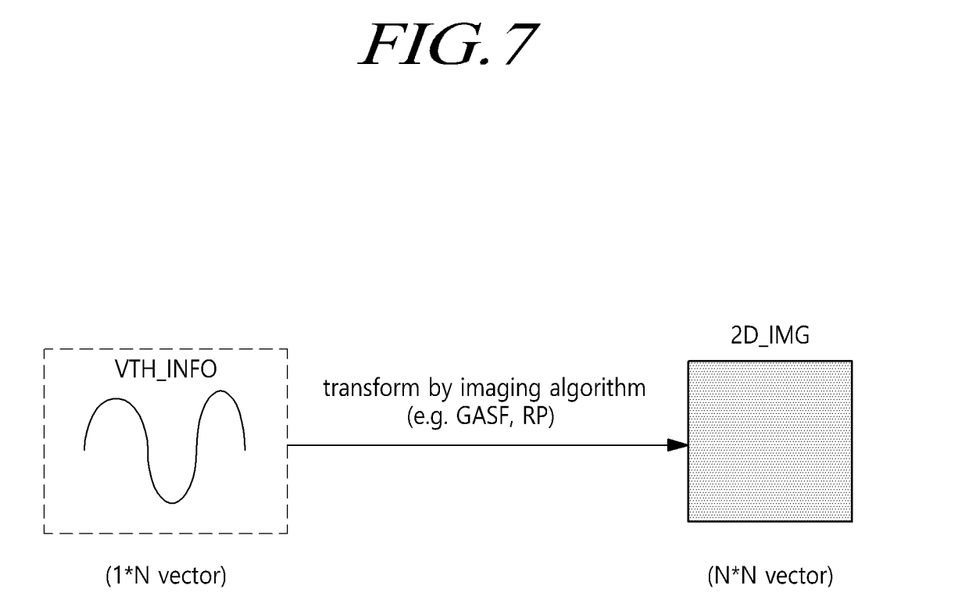
FIG. 7 is a diagram illustrating an example of an imaging algorithm according to an embodiment of the present disclosure.

FIG. 7 is a diagram illustrating an example of an imaging algorithm according to an embodiment of the present disclosure.

Referring to FIG. 7, a processor 120 of a fail classification device 100 may transform a threshold voltage distribution information VTH_INFO into a two-dimensional image 2D_IMG using a preset imaging algorithm.

The threshold voltage distribution information VTH_INFO is sequentially measured data, and may be considered as time series data in that the number of memory cells corresponding to one threshold voltage included in the threshold voltage distribution information VTH_INFO and the number of memory cells corresponding to another threshold voltage included in the threshold voltage distribution information VTH_INFO are highly correlated with each other. Therefore, an imaging algorithm that transforms one-dimensional time series data into a two-dimensional image may be used.

By transforming the threshold voltage distribution information VTH_INFO into a two-dimensional image 2D_IMG using the imaging algorithm, even when the size of the threshold voltage distribution information VTH_INFO varies, a similar image may be obtained using the same imaging algorithm.

For example, the imaging algorithm may be the Gramian angular summation field (GASF) algorithm or the recurrent plot (RP) algorithm.

When there are multiple two-dimensional images 2D_IMG, the processor 120 may use a different imaging algorithm for each two-dimensional image.

In an embodiment, when the threshold voltage distribution information VTH_INFO is expressed as a 1*N one-dimensional vector, the two-dimensional image 2D_IMG may be expressed as an N*N two-dimensional vector. For example, when the threshold voltage distribution information VTH_INFO is a 1*40 one-dimensional vector, the two-dimensional image 2D_IMG may be a 40*40 two-dimensional vector.

In other words, compared to the threshold voltage distribution information VTH_INFO, the number of parameters in the two-dimensional image 2D_IMG is increased by N times. As a result, it is possible to obtain a potential variable that is not revealed in the threshold voltage distribution information VTH_INFO, and by analyzing the potential variable through an artificial intelligence model, the performance of a fail classification operation may be improved.

Hereinafter, an operation of classifying the fail type of the plurality of memory cells by inputting the transformed two-dimensional image 2D_IMG into a target artificial intelligence model TGT_MDL will be described.

Figure 8:
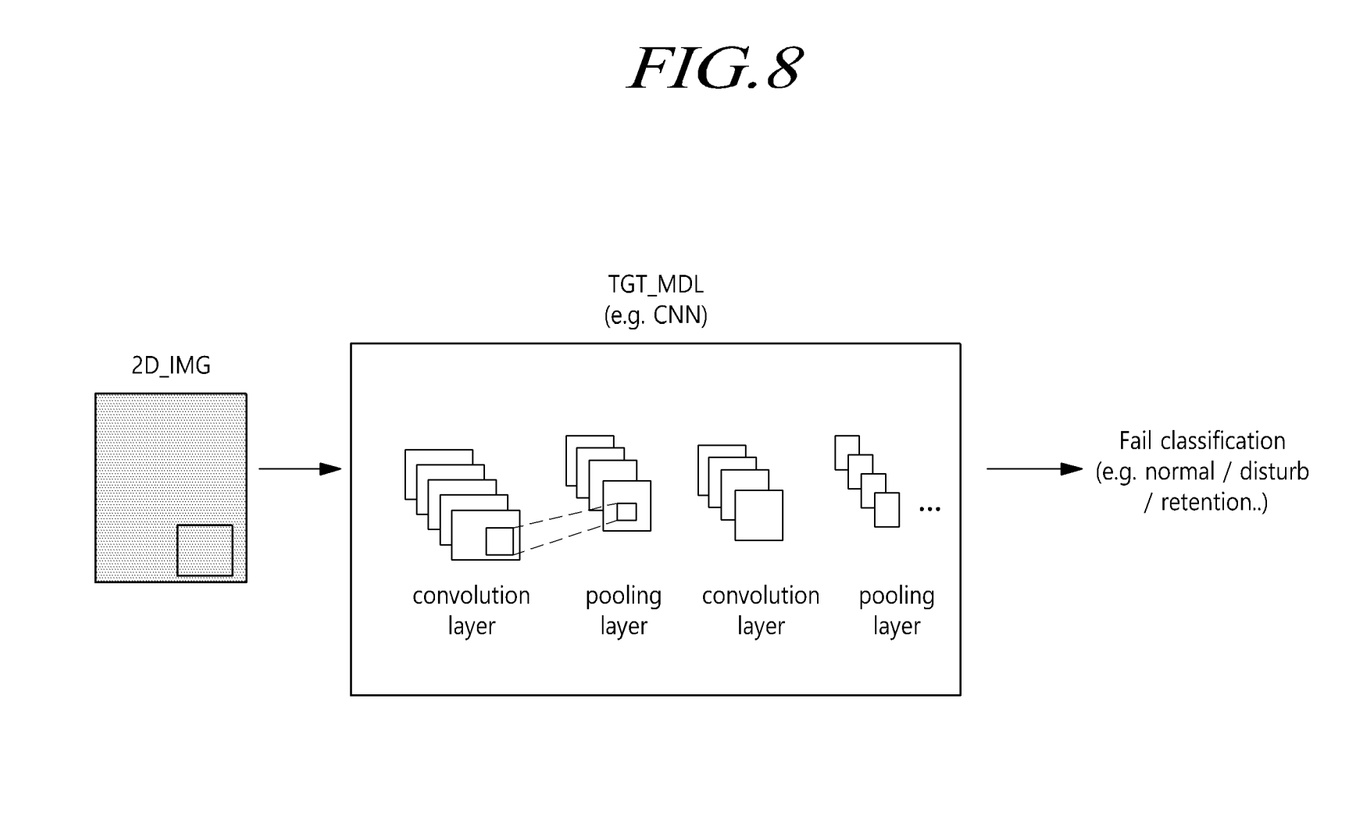
FIG. 8 is a diagram illustrating an example of a target artificial intelligence model according to an embodiment of the present disclosure.

FIG. 8 is a diagram illustrating an example of a target artificial intelligence model according to an embodiment of the present disclosure.

Referring to FIG. 8, a target artificial intelligence model TGT_MDL may be, for example, a convolutional neural network (CNN).

The convolutional neural network (CNN) may include at least one convolution layer and at least one pooling layer, and is an artificial intelligence model that is specialized in classifying a two-dimensional image.

A processor 120 of a fail classification device 100 may classify the fail type of a plurality of memory cells on the basis of the output result of the target artificial intelligence model TGT_MDL. The target artificial intelligence model TGT_MDL may output the probability that the plurality of memory cells corresponds to each of preset fail types. The processor 120 may classify the fail type of the plurality of memory cells according to the probability outputted by the target artificial intelligence model TGT_MDL.

For example, the processor 120 may classify the fail type of the plurality of memory cells as a normal type, a disturb type or a retention type.

The normal type means that a fail has not occurred in the plurality of memory cells, the disturb type means that a fail has occurred in the plurality of memory cells due to disturbance, and the retention type means that a fail has occurred in the plurality of memory cells due to retention.

Figure 9:
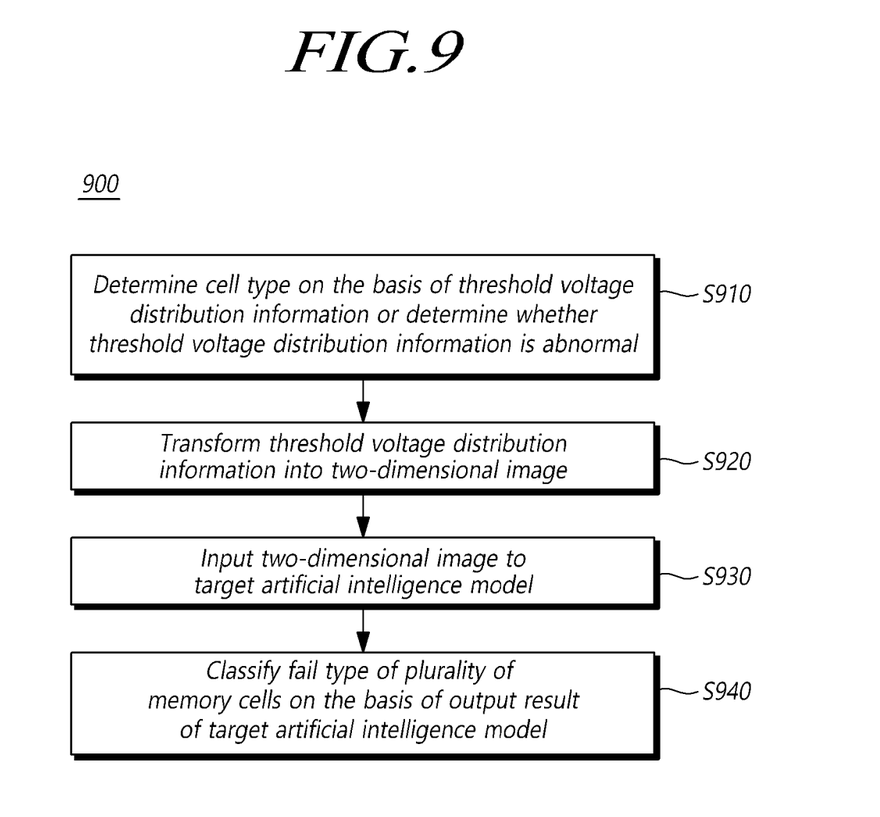
FIG. 9 is a diagram illustrating a fail classification method according to an embodiment of the present disclosure.

FIG. 9 is a diagram illustrating a fail classification method according to an embodiment of the present disclosure.

Referring to FIG. 9, in step S910 a fail classification method 900 may include using the threshold voltage distribution information VTH_INFO of the plurality of memory cells to determine a cell type indicating the number of bits per memory cell of the plurality of memory cells or to determine whether the threshold voltage distribution information VTH_INFO is abnormal.

The threshold voltage distribution information VTH_INFO may indicate N (where N is a natural number of 2 or greater) number of memory cell counts determined on the basis of an N number of threshold voltages. An ith (where i is a natural number equal to or less than N) memory cell count, from among an N number of memory cell counts, may indicate the number of memory cells corresponding to an ith threshold voltage, from among the N number of threshold voltages.

For example, the step S910 may include determining the number of minimum values from among the N number of memory cell counts on the basis of a set peak finding algorithm, and on the basis of the number of minimum values, determining a cell type or determining whether threshold voltage distribution information is abnormal.

For example, determining a cell type or determining whether threshold voltage distribution information is abnormal may use, when the number of minimum values is 1, the percentage of memory cells having threshold voltages smaller than a threshold voltage corresponding to a minimum value among the plurality of memory cells or the percentage of memory cells having threshold voltages larger than the threshold voltage corresponding to the minimum value.

In another example, determining a cell type or determining whether threshold voltage distribution information is abnormal may use, when the number of minimum values is 2 or greater, the number of minimum values and the percentage of memory cells having threshold voltages between a threshold voltage corresponding to a first minimum value and a threshold voltage corresponding to a second minimum value. The first minimum value and the second minimum value may be minimum values that are adjacent to each other.

The fail classification method 900 may include step S920 of transforming the threshold voltage distribution information VTH_INFO into a two-dimensional image 2D_IMG.

For example, performing step S920 may transform the threshold voltage distribution information VTH_INFO into the two-dimensional image 2D_IMG using a preset imaging algorithm.

The fail classification method 900 may include step S930 of inputting the two-dimensional image 2D_IMG to a target artificial intelligence model TGT_MDL corresponding to a cell type.

The fail classification method 900 may include step S940 of classifying the fail type of the plurality of memory cells on the basis of the output result of the target artificial intelligence model TGT_MDL.

For example, performing step S940 may classify the fail type of the plurality of memory cells as a normal type, a disturb type or a retention type.

The fail classification method 900 may be executed by the fail classification device 100 described above.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A fail classification device comprising:
   a memory with a plurality of memory cells configured to store threshold voltage distribution information, which includes information regarding an N number of threshold voltages and a memory cell count for each of the N number of threshold voltages; and
   a processor configured to:
   determine, using the threshold voltage distribution information and the N number of memory cell counts corresponding to each of the N number of threshold voltages, that the threshold voltage distribution information is used to indicate a cell type of the plurality of memory cells,
   determine the cell type indicating the number of bits per memory cell of the plurality of memory cells on the basis of the threshold voltage distribution information,
   transform the threshold voltage distribution information into a two-dimensional image,
   input the two-dimensional image to a target artificial intelligence model corresponding to the cell type, and
   classify a fail type of the plurality of memory cells on the basis of an output result of the target artificial intelligence model,
   wherein the fail type is a first fail type when the processor determines the cell type using the threshold voltage distribution information and the fail type is a second fail type when the processor determines that the threshold voltage distribution information is unable to be used to classify the cell type.

2. The fail classification device according to claim 1, wherein
   the threshold voltage distribution information includes an ith memory cell count from among the N number of memory cell counts that indicates a quantity of memory cells corresponding to an ith threshold voltage from among the N number of threshold voltages,
   wherein N is a natural number of 2 or greater, and
   i is a natural number of N or less.

3. The fail classification device according to claim 1, wherein
   the processor identifies at least one threshold voltage minimum value from among the N number of threshold voltages and determines a total number of threshold voltage minimum values using a set peak finding algorithm,
   and
   the processor determines the cell type on the basis of percentages of memory cells, calculated using a quantity of memory cells and the plurality of memory cells, at each of the threshold voltage minimum values.

4. The fail classification device according to claim 3, wherein, when the total number of the threshold voltage minimum values is 1, the processor
   determines the cell type on the basis of a percentage of memory cells having threshold voltages smaller than the threshold voltage minimum value and a percentage of memory cells having threshold voltages larger than the threshold voltage corresponding to the minimum value.

5. The fail classification device according to claim 3, wherein
when the total number of the threshold voltage minimum values is equal to or greater than 2, the processor determines the cell type of the plurality of memory cells on the basis of the percentage of memory cells from among the plurality of memory cells having threshold voltages between a first threshold voltage minimum value and a second threshold voltage minimum value, and
the first threshold voltage minimum value and the second threshold voltage minimum value correspond to two threshold voltage distribution peaks that are adjacent to each other in the threshold voltage distribution information.

6. The fail classification device according to claim 1, wherein the processor transforms the threshold voltage distribution information into the two-dimensional image using a preset imaging algorithm.

7. The fail classification device according to claim 6, wherein the preset imaging algorithm is a Gramian angular summation field (GASF) algorithm or a recurrent plot (RP) algorithm.

8. The fail classification device according to claim 1, wherein the target artificial intelligence model is a convolutional neural network (CNN).

9. The fail classification device according to claim 1, wherein the processor classifies the fail types of the plurality of memory cells as a normal type, a disturb type or a retention type.

10. A fail classification method comprising:
determining, using threshold voltage distribution information for a plurality of memory cells, which includes information regarding a plurality of threshold voltages and a memory cell count for each of the plurality of threshold voltages, a cell type indicating a number of bits per memory cell of the plurality of memory cells used to indicate that the threshold voltage distribution information is used;
transforming the threshold voltage distribution information into a two-dimensional image;
inputting the two-dimensional image to a target artificial intelligence model corresponding to the cell type; and
classifying a fail type of the plurality of memory cells based on an output result of the target artificial intelligence model,
wherein the fail type is a first fail type when a processor determines the cell type using the threshold voltage distribution information and the fail type is a second fail type when the processor determines that the threshold voltage distribution information is unable to be used to classify the cell type.

11. The fail classification method according to claim 10, wherein
the threshold voltage distribution information indicates an N number of memory cell counts determined based on an N number of threshold voltages within the plurality of threshold voltages,
an ith memory cell count among the N number of memory cell counts indicates a quantity of memory cells out of the plurality of memory cells corresponding to an ith threshold voltage from among the N number of threshold voltages,
wherein N is a natural number of 2 or greater, and i is a natural number of N or less.

12. The fail classification method according to claim 10, wherein the determining of the cell type comprises
identifying at least one threshold voltage minimum value from among the plurality of threshold voltages and determining a total number of threshold voltage minimum values based on a set peak finding algorithm; and
determining, on the basis of the total number of threshold voltage minimum values, the cell type of the plurality of memory cells.

13. The fail classification method according to claim 12, wherein when the total number of threshold voltage minimum values is 1, determining the cell type is based on a percentage of memory cells having threshold voltages smaller than a threshold voltage corresponding to the at least one threshold voltage minimum value and a percentage of memory cells having threshold voltages larger than the threshold voltage corresponding to the at least one threshold voltage minimum value.

14. The fail classification method according to claim 12, wherein
when the total number of threshold voltage minimum values is equal to or greater than 2, determining the cell type of the plurality of memory cells is based on the total number of threshold voltage minimum values and a percentage of memory cells having threshold voltages between a threshold voltage corresponding to the at least one threshold voltage minimum value and another threshold voltage minimum value, and
the at least one threshold voltage minimum value and the another threshold voltage minimum value are two threshold voltage minimum values that are adjacent to each other.

15. The fail classification method according to claim 10, wherein the transforming of the threshold voltage distribution information into the two-dimensional image transforms the threshold voltage distribution information into the two-dimensional image using a preset imaging algorithm.

16. The fail classification method according to claim 10, wherein the classifying of the fail type of the plurality of memory cells classifies the fail type of the plurality of memory cells as a normal type, a disturb type or a retention type.

17. The fail classification device according to claim 9, wherein the first fail type is a normal type when the threshold voltage distribution information can be used to indicate a cell type of the plurality of memory cells and the second fail type is a disturb type or a retention type when the threshold voltage distribution information cannot be used to indicate a cell type of the plurality of memory cells.

18. The fail classification device according to claim 4, wherein, when a difference between the percentage of memory cells having threshold voltages smaller than the threshold voltage minimum value and a preset reference percentage is equal to or less than a threshold percentage, the processor determines the cell type as a single level cell.

19. The fail classification device according to claim 4, wherein when a difference between the percentage of memory cells having threshold voltages smaller than the threshold voltage minimum value and a preset reference percentage is greater than a threshold percentage, the processor determines the threshold voltage distribution information cannot be used to indicate the cell type of the plurality of memory cells.

20. The fail classification method according to claim 16, wherein the first fail type is a normal type when the threshold voltage distribution information can be used to indicate a cell type of the plurality of memory cells and the second fail type is a disturb type or a retention type when the threshold voltage distribution information cannot be used to indicate a cell type of the plurality of memory cells.

* * * * *